Aug. 4, 1964
E. C. YACKEL ETAL
3,143,414
PROCESS FOR PREPARING DIRECT POSITIVES
Filed March 2, 1961
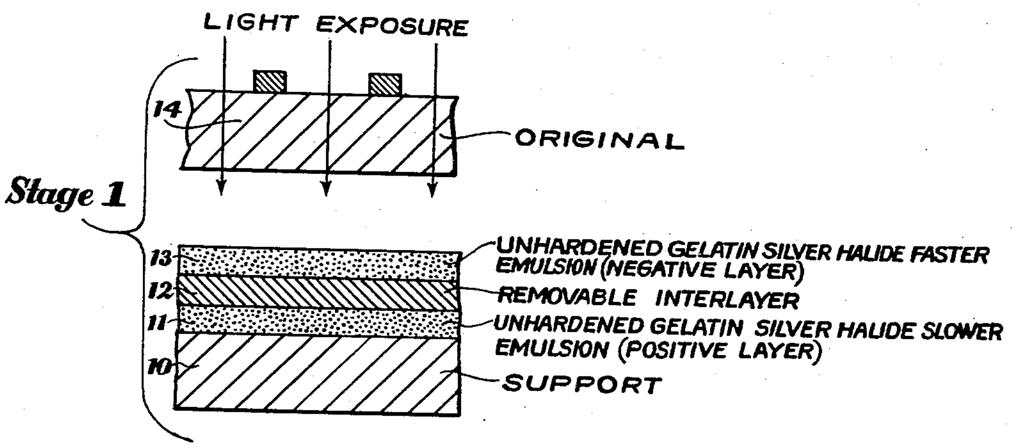
Stage 1
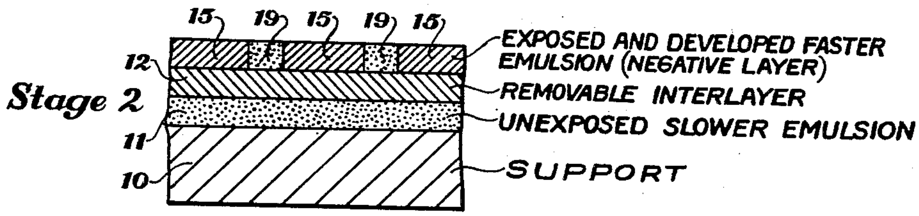
Stage 2
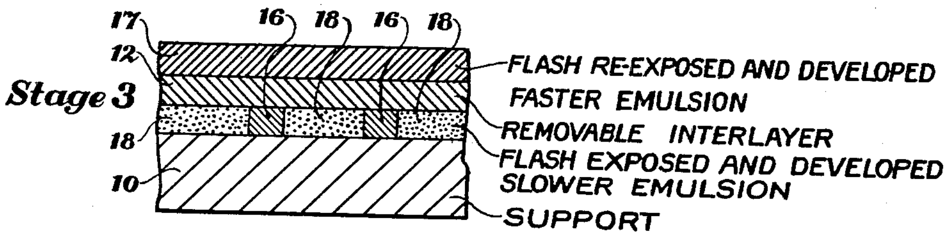
Stage 3
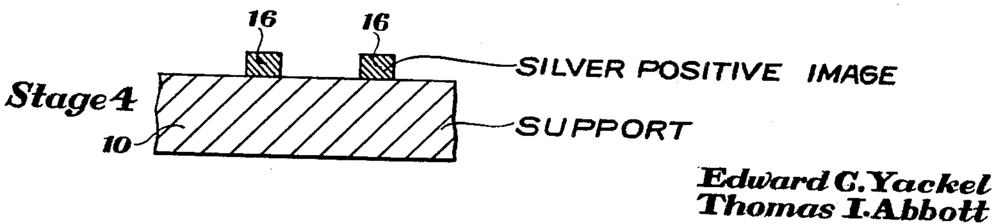
Stage 4
Edward C. Yackel
Thomas I. Abbott
INVENTORS
BY R. Frank Smith
James R. Frederick
ATTORNEYS United States Patent Office 3,143,414
Patented Aug. 4, 1964

3,143,414

PROCESS FOR PREPARING DIRECT POSITIVES

Edward C. Yackel and Thomas I. Abbott, Rochester, N.Y., assignors to Eastman Kodak Company, Rochester, N.Y., a corporation of New Jersey Filed Mar. 2, 1961, Ser. No. 92,874
6 Claims. (Cl. 96—27)

The present invention concerns the production of photographic images by a direct positive process, and more particularly, to the production of photographic images with a light-sensitive element having integral negative and positive layers.

It is an object of this invention to provide a new simplified negative-positive process.

It is another object of this invention to prepare direct positives by a novel process utilizing a photographic element having negative and positive layers whereby there is a built-in safety factor against overexposure of the positive layer.

It is another object of this invention to prepare direct positives by a new process with a single photographic element that can be activated or developed with an aqueous alkaline composition.

It is likewise an object of this invention to prepare by a new method direct positives from a photographic element having incorporated developer.

It is also an object of this invention to prepare direct positives by a novel process that requires no fixing step.

It is a still further object of this invention to provide a new direct positive process suitable for reproducing line and halftone originals.

The process of the invention concerns preparing direct positives with a light-sensitive element having a support, an unhardened gelatino-silver halide emulsion layer serving as a positive layer, a gelatino-silver halide emulsion layer positioned further from the support than the positive layer and serving as a negative layer, and an interlayer positioned between the positive and negative layers comprising a water-soluble hydrophilic colloid not hardened by oxidized tanning developers, the light-sensitive element having substantially greater light sensitivity to a region of the visible spectrum in the negative layer than the positive layer when exposed through the negative layer. In the present process, the negative layer is exposed to form a latent image therein without exposing the positive layer, the latent image in the negative layer is developed in an aqueous alkaline solution with a tanning developer to form a silver negative image therein, the positive layer is then exposed through the negative silver image in the presence of the aqueous alkaline solution and tanning developer and thereby a silver positive image is formed in the positive layer, and thereafter the negative layer, the interlayer and undeveloped portions of the unhardened gelatino-silver halide in the positive layer are washed away leaving a silver positive image on the support.

The drawing illustrates in section and schematically, several stages of the present process. Stage 1 of the drawing illustrates a projection light exposure through an original on a typical light-sensitive element employed in the present process. Stage 2 of the drawing illustrates the exposed and developed negative layer of the light-sensitive element. Stage 3 of the drawing illustrates the flash re-exposed and fully developed negative layer and the flash exposed and developed positive layer containing the silver positive image of the light-sensitive element. Stage 4 of the drawing illustrates the silver positive image formed in Stage 3 in the positive layer on the support after the negative layer, the interlayer and unexposed and undeveloped portions of the unhardened gelatino-silver halide emulsion in the original positive layer have been washed away.

With respect to the present light-sensitive elements employed to prepare direct positives in accordance with the present process, there are typically utilized three layers on a support as illustrated in the drawing. With reference to the embodiment in the drawing, support 10 has unhardened gelatino-silver halide emulsion layer 11 coated thereon which serves as the positive layer in which the ultimate silver positive image is formed in the present process. Coated on the positive layer is removable interlayer 12 which comprises a water-soluble hydrophilic colloid that is not hardened by oxidized tanning developers. Over removable interlayer 12 is coated gelatino-silver halide layer 13 which serves as the negative layer in which the negative of the original being copied is formed. The subject light-sensitive element comprising support 10 and superimposed layers 11, 12 and 13 has substantially greater light sensitivity to a region of the visible spectrum in negative layer 13 than in positive layer 11 when exposed through the negative layer 13.

In carrying out a typical process of the invention as illustrated in the drawing, original 14 is projected, typically with white light, onto the light-sensitive element comprising support 10 and layers 11, 12 and 13 as illustrated in Stage 1 of the drawing. The exposure of the projection of the original is made sufficient to form a latent image of the original in negative layer 13, which for purposes of illustration, comprises a gelatino-silver halide emulsion that is a faster emulsion than positive layer 11. Positive layer 11, comprising an unhardened gelatino-silver halide emulsion, is not exposed in the original exposure. The light-sensitive element is then immersed in an aqueous alkaline solution and the latent image in negative layer 13 developed with a tanning developer to produce a negative silver image 15 therein. The resulting negative layer containing silver negative image 15 is thereafter re-exposed while the light-sensitive element is activated with the aqueous alkaline solution and tanning developer, the re-exposure being through silver negative image 15 and sufficient to expose positive layer 11 and form a latent positive image therein. This re-exposure is typically effected with a photoflood or by merely exposing to room light. The latent positive image in positive layer 11 is then developed by the tanning developer in the aqueous alkaline solution to form silver positive image 16 in tanned gelatin. On re-exposure in the aqueous alkaline solution in the presence of the tanning developer, the negative layer develops to form silver image 17 substantially throughout, this silver layer serving as a built-in safety factor against over-exposure of positive layer 11. Extended exposure of the negative layer merely results in a light impervious protective silver shield for positive layer 11 containing positive silver image 16 and unexposed, undeveloped and unhardened gelatino-silver halide emulsion 18 as gelatino-silver halide 19 in negative layer 15 unexposed by the initial exposure is exposed by this second exposure and developed. Thereafter, the re-exposed negative layer, namely, silver image 17, removable interlayer 12 and unexposed, undeveloped and unhardened gelatino-silver halide emulsion 18 is washed away leaving silver positive image 16 on support 10.

The method of exposure utilized to expose the negative layer can be widely varied. Typical exposure methods include projection exposure through the positive with an enlarger, exposure through a positive transparency with a contact printer and exposure in a camera.

The developer utilized in the present process is a tanning developer. The tanning developer is activated in aqueous alkaline solutions and tans the gelatin in the area of development. The tanning developer can be incorporated in the negative layer and positive layer in the light-sensitive element processed in accordance with the present invention, or the tanning developer can be added to the aqueous alkaline solution employed in the processing thereof. Typical tanning developers that are suitable in the present process include:

4-phenyl catechol
Methyl pyrocatechol
Methyl gentisate
Gentisaldehyde
N-β-hydroxy gentisamide
Gentisamide
Gentisaldoxime
4-tertiary butyl catechol
3-methoxy catechol
4-hexylpyrogallol
2-phenoxy hydroquinone
4,4′-(2,3-dimethyltetramethylene)dipyrocatechol
6,7,6′,7′ - tetrahydroxy - 4,4,4′,4′ - tetramethyl - bis - 2,2′-spirochroman
Nordihydroguaiaretic acid
Toly-duro-xylo- and pseudo-cumo-hydroquinones and the like. Reference is made to Yackel U.S. Patent No. 2,592,368, dated April 8, 1952, and Yackel U.S. Patent No. 2,685,510 dated August 3, 1954, with respect to tanning developing agents and their incorporation and use in photographic emulsions.

Aqueous alkaline solutions are employed to activate the tanning developer in accordance with usual practice. Such alkaline solutions desirably have a pH of at least about 9 or 10, although the alkalinity of the developing solution can be widely varied in accordance with usual practice. Alkaline materials as alkali metal carbonates and hydroxides including sodium carbonate, sodium hydroxide, potassium carbonate, potassium hydroxide, and the like, can be suitably employed as alkaline materials in such solutions.

The removable interlayer comprises a water-soluble hydrophilic organic colloid that is not hardened by oxidized tanning developers. This layer assures the complete removal of the superposed negative layer during the wash step. Typical interlayers that can be utilized include cellulose ether phthalates, methyl celluloses, ethyl celluloses, polyvinyl alcohols and the like. Preferred interlayers are hydrophilic carboxylated cellulose derivatives such as alkali-soluble dibasic acid esters of ethyl cellulose including ammonium, alkali metal and amine salts of such dibasic acids as phthalic, succinic, and maleic acid. Particularly useful interlayers are phthalates of ethyl cellulose of ethoxyl content and phthalyl content of at least about 5%. Suitable carboxylated cellulosic compounds are described in Malm et al. U.S. Patent No. 2,093,463, dated September 21, 1937, Talbot et al. U.S. Patent No. 2,725,293, dated November 29, 1955, and copending Yackel et al. application U.S. Serial No. 586,705, filed May 25, 1956. Such protein materials are gelatin, which are hardened by oxidized tanning developers, are not suitable interlayer materials in the present instance.

The negative layer can be either unhardened or hardened gelatino-silver halide layers. The positive layer should be an unhardened gelatino-silver halide layer. In the present process the negative layer is readily removed by washing, as the interlayer, which is soluble in water, separates the negative layer from the positive layer. The positive layer is comprised of unhardened gelatin, and thus, this unhardened gelatin can be readily washed from the positive silver image. The gelatin immediately surrounding the silver positive image is hardened by the oxidized tanning developer and thus serves to protect the silver positive image on the support. The cellulose ether phthalates described above as interlayers can also be utilized as the colloidal vehicle for the negative layer.

The alkaline salts in the aqueous developing or activating solution repress the solution of the water-soluble hydrophilic interlayer, and thus, the interlayer with the negative layer positioned thereon remains intact during the development of the silver negative image. However, these two layers are readily removed during the washing step wherein the alkaline salts in the developing or activating solution are substantially reduced or eliminated. The negative layer can be suitably removed with the interlayer by washing with water at ambient temperatures. However, the unexposed and undeveloped portions of the unhardened gelatino-silver halide emulsion in the positive layer are desirably washed away with warm water, generally at least about 90° F.

The support of the subject light-sensitive elements processed in accordance with the invention can be any of the common supports used for photographic products including cellulose nitrate film, cellulose acetate film, polyvinyl acetal film, polystyrene film, polyethylene terephthalate film and related films of resinous materials as well as glass, paper, metals and others.

The light-sensitive elements employed have substantially greater light sensitivity in a region of the visible spectrum in the negative layer than the positive layer when exposed through the negative layer. The negative layer is generally at least three times more light-sensitive than the positive layer. In a preferred embodiment of the invention the negative layer is simply made with a faster emulsion than the emulsion employed to prepare the positive layer. With such light-sensitive elements, the original light exposure of the negative layer could be effected through the support, if transparent, or from the same side of the support as the negative layer as illustrated by the embodiment in the drawing, Stage 1. In another embodiment of the invention the negative layer can be optically sensitized to a different portion of the spectrum than the positive layer and the light exposure through the original effected with a light suitable to expose the negative layer and not the positive layer. For example, the negative layer could be optically sensitized to red light, the positive layer being an unsensitized silver halide emulsion not sensitive to red light, and the exposure through the original effected with red light. Other related embodiments of the invention include the use of color filters or dyes in the interlayer between the negative layer and the positive layer or color filters or dyes in the positive layer, the purpose being to lend to the negative layer a different light sensitivity to a region of the spectrum than the positive layer when exposed through the negative layer. On re-exposing the negative layer containing a silver negative image to expose the positive layer in such instances, light to which the negative layer and positive layer are both sensitive is utilized. The preparation of photographic emulsions having different sensitivities to different regions of the spectrum are well-known in the art.

The photographic gelatino-silver halide emulsions employed in the negative and positive layers of the light-sensitive elements processed in accordance with our invention can be gelatino-silver chloride, gelatino-silver chlorobromide, gelatino-silver chloroiodide, gelatino-silver chlorobromoiodide, gelatino-silver bromide and gelatino-silver bromoiodide emulsions of the developing out type. Such emulsions can be prepared by well-known methods as taught in such patents as U. S. Patent No. 2,618,556, dated November 18, 1952, and others. The photographic gelatino-silver halide emulsions employed can contain common emulsion addenda including chemical sensitizers such as sulfur sensitizers, gold, etc.; optical sensitizers such as cyanine and merocyanine dyes; stabilizers such as mercury compounds, quaternary benzothiazolium compounds, bis-quaternary salts etc.; speed-increasing compounds such as certain polyethylene glycol derivatives; plasticizers such as glycerol, ethylene bis-(methyl glycolate), polymeric hydrosole etc.; coating aids such as saponin, oleoyl monoether of a polyethylene glycol etc.; dispersing agents such as colloidal albumin, a cellulose derivative, hydrolyzed polyvinyl acetate, etc. and other commonly utilized addenda to photographic gelatino-silver halide emulsions.

The present process reproduces line and halftone originals with high definition. As the positive layer contains an unhardened gelatin emulsion, the unexposed and undeveloped portions of this layer are readily washed out with warm water. The negative layer is also readily washed away with the interlayer as described above. Hence, a fixing step is not needed in the present process. A preferred embodiment of the invention utilizes the tanning developer incorporated in the negative and positive emulsion layers and the developer can be readily activated by immersing the light-sensitive element in an aqueous alkaline solution after exposure. Hence, the present process provides a simple and fast method for preparing direct positives with a single light-sensitive element.

The invention is illustrated by the following examples of preferred embodiments thereof.

*Example 1*

A three-layer light-sensitive element was processed in accordance with the invention. The light-sensitive element had a cellulose acetate film support, a gelatino-silver chloride emulsion coated thereon containing a green sensitizer, 4-phenyl catechol, a saponin solution and water. The emulsion was coated on the support at a concentration of 7.5 cc. per sq. ft. This layer served as the positive layer and its composition is summarized below:

| | | |
|---|---|---|
| Gelatino-silver chloride emulsion 3200 g./mole Ag | g. | 364 |
| Green sensitizer, 1 mg./cc. methanol | cc. | 7 |
| 4-phenyl catechol dispersion | g. | 140 |
| 15% saponin solution | cc. | 40 |
| Water | cc. | 199 |

The 4-phenyl catechol dispersion was prepared with 25 g. of 4-phenyl catechol dissolved in 100 cc. of dibutyl phthalate at 60–70° C. dispersed in 500 cc. of 10% photographic gelatin and 50 cc. 7.5% saponin solution and passed through a colloid mill five times. Superimposed on the negative layer was a cellulose ether phthalate layer. The cellulose ether phthalate was the ammonium salt of a phthalate of ethyl cellulose having an ethoxyl content of about 12% and a phthalyl content of about 20%. The cellulose ether phthalate layer was coated as a 3.5% aqueous cellulose ether phthalate solution at a concentration of 4.5 cc. per sq. ft. Superimposed on the interlayer was a negative layer comprising a gelatino-silver chloride emulsion, a green sensitizer, the 4-phenyl catechol dispersion as described in the positive layer, a saponin solution and water. This negative layer was coated at a concentration of 10 cc. per sq. ft. on the interlayer. The make-up of the negative layer is summarized below:

| | | |
|---|---|---|
| Gelatino-silver chloride emulsion, 3150 g./mole Ag | g. | 280 |
| Green sensitizer, 1 mg./cc. acetone | cc. | 10 |
| 4-phenyl catechol dispersion | g. | 140 |
| 15% saponin solution | cc. | 40 |
| Water | cc. | 120 |

The emulsion of the negative layer had about 10 times the speed to white light as did the emulsion in the positive layer. The described light-sensitive element was exposed to a positive halftone original with a 100 watt bulb for one second at a distance of two feet. The resulting exposed element was immersed in an aqueous 4% sodium carbonate solution for 20 seconds, flash exposed with a No. 2 Photoflood for ⅛ second at a distance of one foot while in the aqueous sodium carbonate solution, and thereafter washed in warm water to remove the negative layer, the cellulose ether phthalate layer and unexposed and undeveloped portions of the positive layer leaving a silver positive image in tanned gelatin on the support. This latter washing was effected by two different techniques on different samples. On one sample the top negative layer and interlayer were washed out with warm water at a temperature of 70° F. and then the positive layer was washed free of unexposed and undeveloped emulsion with water at a temperature of 120° F. A second sample was washed only with warm water at a temperature of 104° F. In both instances excellent sharp, clean reproductions of the original resulted. The substitution of a gelatino-silver chlorobromide emulsion for the gelatino-silver chloride emulsion in the negative layer produces similar results.

*Example 2*

A light-sensitive element was prepared as described in Example 1 except that the negative and positive layers were coated at a 25% less coverage, and in lieu of film base, a paper base having a thin film of polyethylene thereon was used. The initial exposure through the original was for ¾ second with a 100 watt bulb at a distance of two feet. The exposed element was then immersed for 10 seconds in a 4% aqueous sodium carbonate solution in room temperature. Thereafter flash exposures with a No. 2 Photoflood at a distance of two feet were made in the aqueous sodium carbonate solution at seven different time intervals on seven different samples. The time intervals for the flash exposures ranged from ¼ second to 2 seconds. Thereafter the negative layer, the cellulose ether phthalate interlayer and unexposed and undeveloped portions of the positive layer were removed by washing in running water with agitation at 100° F. leaving a silver positive image in tanned gelatin on the support. Comparison of the seven samples obtained show that the flash re-exposures varying in time from ½ second to 2 seconds all produce substantially identical products. Excellent clean (no background density) prints were obtained over the entire re-exposure range. This wide range of flash exposures illustrates the built-in safety factor for over-exposure existing in the present process.

The invention has been described in detail with particular reference to preferred embodiments thereof, but it will be understood that variations and modifications can be effected within the spirit and scope of the invention as described in the appended claims.

We claim:

1. The process for preparing a direct positive with a light-sensitive element having a support, an unhardened gelatino-silver halide emulsion layer serving as a positive layer, a gelatino-silver halide emulsion layer serving as a negative layer positioned further from said support than said positive layer and an interlayer positioned between said positive layer and said negative layer comprising a hydrophilic colloid not hardened by oxidized tanning developers, said light-sensitive element having substantially greater light sensitivity to a region of the visible spectrum in said negative layer than said positive layer when exposed through said negative layer, which comprises exposing said negative layer and forming a latent image in said negative layer without exposing said positive layer, developing said latent image in said negative layer in an aqueous alkaline solution with a tanning developer and thereby forming a silver negative image in said negative layer, exposing said positive layer through said silver negative image in said negative layer in the presence of said aqueous alkaline solution and said tanning developer and thereby forming a silver positive image in said positive layer, and thereafter washing off said negative layer, said interlayer and undeveloped portions of said unhardened gelatino-silver halide emulsion in said positive layer and leaving said silver positive image on said support.

2. The process according to claim 1 wherein the hydrophilic colloid is a cellulose ether phthalate.

3. The process according to claim 1 wherein the tanning developer is 4-phenyl catechol.

4. The process according to claim 1 wherein the tanning developer is dispersed in the positive layer and the negative layer of the light-sensitive element.

5. The method of forming a silver positive image in a multilayer photographic element having a support, an unhardened gelatino-silver halide emulsion layer containing dispersed therein a tanning developer coated on said support and serving as a positive layer, a layer of a hydrophilic colloid not hardened by oxidized tanning developers coated on said positive layer and a gelatino-silver halide emulsion layer containing dispersed therein a tanning developer coated on said layer of hydrophilic colloid and serving as a negative layer, said negative layer having substantially more sensitivity to visible light than said positive layer, which comprises exposing said negative layer and forming a latent image in said negative layer without exposing said positive layer, activating the tanning developer in said negative layer with an aqueous alkaline solution and thereby developing said latent image in said negative layer to a silver negative image, exposing said positive layer through said negative silver image while the tanning developer in said negative and positive layers is activated with said aqueous alkaline solution and thereby forming a silver positive image in said positive layer, and thereafter washing away with water said negative layer, said layer of hydrophilic colloid and undeveloped portions of said unhardened gelatino-silver halide emulsion in said positive layer and leaving said positive silver image on said support.

6. The process for preparing a direct positive with a light-sensitive element having a support, an unhardened gelatino-silver halide emulsion layer containing dispersed therein 4-phenyl catechol coated on said support and serving as a positive layer, a water-soluble cellulose ether phthalate layer coated on said positive layer and an unhardened gelatino-silver halide emulsion layer containing dispersed therein 4-phenyl catechol coated on said cellulose ether phthalate layer and serving as a negative layer, said negative layer having at least three times the sensitivity to visible light as said positive layer, which comprises exposing said negative layer and forming a latent image in said negative layer without exposing said positive layer, immersing the resulting exposed light-sensitive element in an aqueous alkaline solution containing an alkali metal carbonate having a pH of at least about 9 and developing said latent image in said negative layer to a silver negative image, exposing said positive layer through said silver negative image in the presence of said aqueous alkaline solution and thereby forming a silver positive image in said positive layer, and thereafter washing off said negative layer, said cellulose ether phthalate layer and undeveloped portions of said unhardened gelatino-silver halide emulsion in said positive layer and leaving said silver positive image on said support, said washing off being effected with water at a temperature of at least about 90° F.

References Cited in the file of this patent

UNITED STATES PATENTS

| | | |
|---|---|---|
| 1,285,015 | Browning | June 8, 1915 |
| 1,303,635 | Capstaff | May 13, 1919 |
| 1,954,337 | Staud | Apr. 10, 1934 |
| 2,716,059 | Yutzy et al. | Aug. 23, 1955 |
| 2,725,296 | Kendall | Nov. 29, 1955 |